(12) United States Patent
Tsuneyoshi

(10) Patent No.: US 12,110,656 B2
(45) Date of Patent: Oct. 8, 2024

(54) FRAME FOR A CONSTRUCTION MACHINE

(71) Applicant: Caterpillar SARL, Geneva (CH)

(72) Inventor: Takeshi Tsuneyoshi, Akashi (JP)

(73) Assignee: Caterpillar SARL, Geneva (CH)

( * ) Notice: Subject to any disclaimer, the term of this patent is extended or adjusted under 35 U.S.C. 154(b) by 865 days.

(21) Appl. No.: 16/972,442

(22) PCT Filed: May 30, 2019

(86) PCT No.: PCT/EP2019/025164
§ 371 (c)(1),
(2) Date: Dec. 4, 2020

(87) PCT Pub. No.: WO2019/233630
PCT Pub. Date: Dec. 12, 2019

(65) Prior Publication Data
US 2021/0230833 A1 Jul. 29, 2021

(30) Foreign Application Priority Data

Jun. 4, 2018 (JP) ................................ 2018-106756

(51) Int. Cl.
*E02F 9/08* (2006.01)
*B62D 21/18* (2006.01)

(52) U.S. Cl.
CPC .......... *E02F 9/0816* (2013.01); *B62D 21/186* (2013.01)

(58) Field of Classification Search
CPC .......... E02F 9/0816; E02F 9/0808; E02F 9/10
USPC ................. 414/687; 296/203.01–203.4, 204
See application file for complete search history.

(56) References Cited

U.S. PATENT DOCUMENTS

| 10,047,499 | B2 * | 8/2018 | Tsuneyoshi | ........... E02F 9/0808 |
| 2015/0299983 | A1 * | 10/2015 | Okamoto | ............. F01N 3/2066 |
| | | | | 180/296 |

FOREIGN PATENT DOCUMENTS

| CN | 102628288 | 8/2012 |
| CN | 103046603 | 4/2013 |
| CN | 103189574 | 7/2013 |
| JP | 2007278039 A | 10/2007 |

(Continued)

OTHER PUBLICATIONS

International Search Report related to PCT Application No. PCT/EP2019/025164 reported on Oct. 10, 2019.

*Primary Examiner* — Ronald P Jarrett

(57) ABSTRACT

Problem to Be Solved: To provide a frame of a construction machine that can prevent a crack caused by a torsion load. Solution: The frame comprises the center member including the bottom plate and a pair of left and right vertical plates disposed on a top surface of the bottom plate, a pair of left and right skirt members horizontally disposed on both left and right sides of the center member, and a plurality of beam members disposed between the center member and right skirt member and between the center member and left skirt member, respectively. The plurality of beam members include the plate beam member disposed in a perpendicularly erected manner against the bottom plate. The first and second bent parts are formed on the plate beam member. The plate beam member has the first part extending outward in a horizontal direction from the center member to the first bent part, the second part extending from the first bent part to second bent part, and the third part extending outward in a horizontal direction from the second bent part to the skirt member.

5 Claims, 7 Drawing Sheets

(56) References Cited

FOREIGN PATENT DOCUMENTS

| | | |
|---|---|---|
| JP | 2008175027 | 7/2008 |
| JP | 2011085085 | 4/2011 |
| JP | 2011099283 | 5/2011 |
| JP | 2011099283 A | 5/2011 |
| JP | 2016079709 A | 5/2016 |

\* cited by examiner

FRAME FOR A CONSTRUCTION MACHINE

This patent application is a 35 USC § 371 U.S. national stage of International Application No. PCT/EP2019/025164 filed on May 30, 2019, which claims the benefit and priority of Japanese Application No. 2018-106756 filed on Jun. 4, 2018, the disclosures of which are incorporated in their entirety by reference herein.

FIELD OF THE INVENTION

The present invention relates to a frame to be used in construction machines such as a hydraulic excavator.

BACKGROUND ART

In general, the hydraulic excavator, a typical example of construction machines, comprises a lower traveling body, an upper swiveling body swivelably mounted on the lower traveling body, and a working arm device operably installed on the upper swiveling body. A frame of the upper swiveling body comprises a center member, a pair of left and right skirt members being horizontally disposed on both sides of the center member and extending in longitudinal direction, and a plurality of beam members connecting the center member and each skirt member. A mounting part of the working arm device is provided on a front end side of the center member for installing the working arm device, and a counterweight attaching part is provided on a back end part of the center member for attaching a counterweight in order to balance with the working arm device.

When the hydraulic excavator travels on a heavily uneven ground or when it drills with the working arm device, the counterweight may oscillate tilting in a horizontal direction as the whole vehicle vibrates. That is to say, the right and left end parts of the counterweight may alternately move vertically around the counterweight attaching part of the center member. In this case, a torsion load (referred to below as "torsion load") acts on the frame of the upper swiveling body that deforms the right skirt member by tilting it from the front to back and up and the left skirt member by tilting it from the front to back and down.

When the torsion load acts on the frame of the upper swiveling body, stresses may be concentrated on each place of the frame including connection parts between the beam members and center or skirt member so that a crack may take place at each place of the frame. Therefore, this applicant proposed a frame of the construction machine including a cab support member of rectangular sectional form (beam member supporting cab) having a front, back, top, and bottom plates, and having a slit on the top plate extending horizontally (refer to Patent Document 1 below). As the frame of this construction machine can suppress the degradation of the flexural rigidity of the cab support member having relatively high flexural and torsion rigidities and reduce the torsion rigidity, the stress concentration can be mitigated on the connection parts and others between the cab support member and center or skirt member by twisting the cab support member when the torsion load is acting on the frame, so that a crack occurrence may be prevented.

CITATION LIST

Patent Document

PTL 1: Japanese Unexamined Patent Application Publication No. 2016-79709

SUMMARY OF INVENTION

Problem to be Solved by the Invention

However, although the frame of the construction machine disclosed in the Patent Document 1 above can present the crack occurrence at the connection parts and others between the cab support member having the slit and skirt or center member, the crack may occur at the other parts of the frame when the torsion load is applied.

In consideration of what mentioned above, a task of the present invention is to provide a frame of the construction machine that can prevent the crack caused by the torsion load.

Means for Solving the Problem

In order to solve the task above, this invention provides the following frame of the construction machine. That is, the frame of the construction machine comprising a center member including a bottom plate and a pair of left and right vertical plates being horizontally disposed at intervals on a top surface of the bottom plate, extending longitudinally, and being provided with a counterweight attaching part at a back end part; a pair of left and right skirt members being horizontally disposed on both left and right sides of the center member and extending in longitudinal direction: and a plurality of beam members disposed at intervals in a longitudinal direction between the center member and right skirt member and between the center member and left skirt member, respectively; wherein the plurality of beam members include plate beam member disposed in a perpendicularly erected manner against the bottom plate: wherein the plate beam member is formed with first and second bent parts; and wherein the plate beam member includes a first part extending outward in a horizontal direction from the center member to the first bent part, a second part extending from the first to second bent part, and a third part extending outward in a horizontal direction from the second bent part to the skirt member.

Preferably, a height dimension of the first or second bent part of the plate beam member is smaller than those of horizontally inside end part of the first part and horizontally outside end part of the third part. When the dimension from the horizontally outside end part of the center member to horizontally inside end part of the skirt member is assumed to be L, each of the first and second bent parts should be suitably located between L/4 and 3L/4. When an angle between an inner surface of the second part of the plate beam member and outer surface of the vertical plate of the center member is assumed to be $\theta$, the $\theta$ should be conveniently $0 \leq \theta \leq 45$ degrees. It is preferable that the plate beam member is the nearest to the counterweight attaching part out of the plurality of the beam members disposed between the center member and the right skirt member or out of the plurality of the beam members disposed between the center member and the left skirt member.

Effects of the Invention

In the frame of the construction machine provided by the present invention, as the plate beam member is disposed in a perpendicularly erected manner against the bottom plate, while the degradation of the flexural rigidity of the plate beam member is suppressed, the torsion rigidity of the plate beam member is degraded because the plate beam members have the first and second bent parts. Therefore, according to the frame of the construction machine of this invention, when a torsion load is acted, the plate beam member twists from the first and second bent parts as starting points so that a deformation resulted from the torsion load is hardly transmitted to other parts than the plate beam member, a stress concentration is mitigated on each place such as the connection parts between the skirt and beam members, and a crack occurrence is prevented.

DESCRIPTION OF EMBODIMENT

Now, an explanation is provided for a suitable embodiment of the frame of the construction machine configured according to this invention by giving a swiveling frame used for the upper swiveling body of the hydraulic excavator as an example and by referring to drawings.

Figure 1:
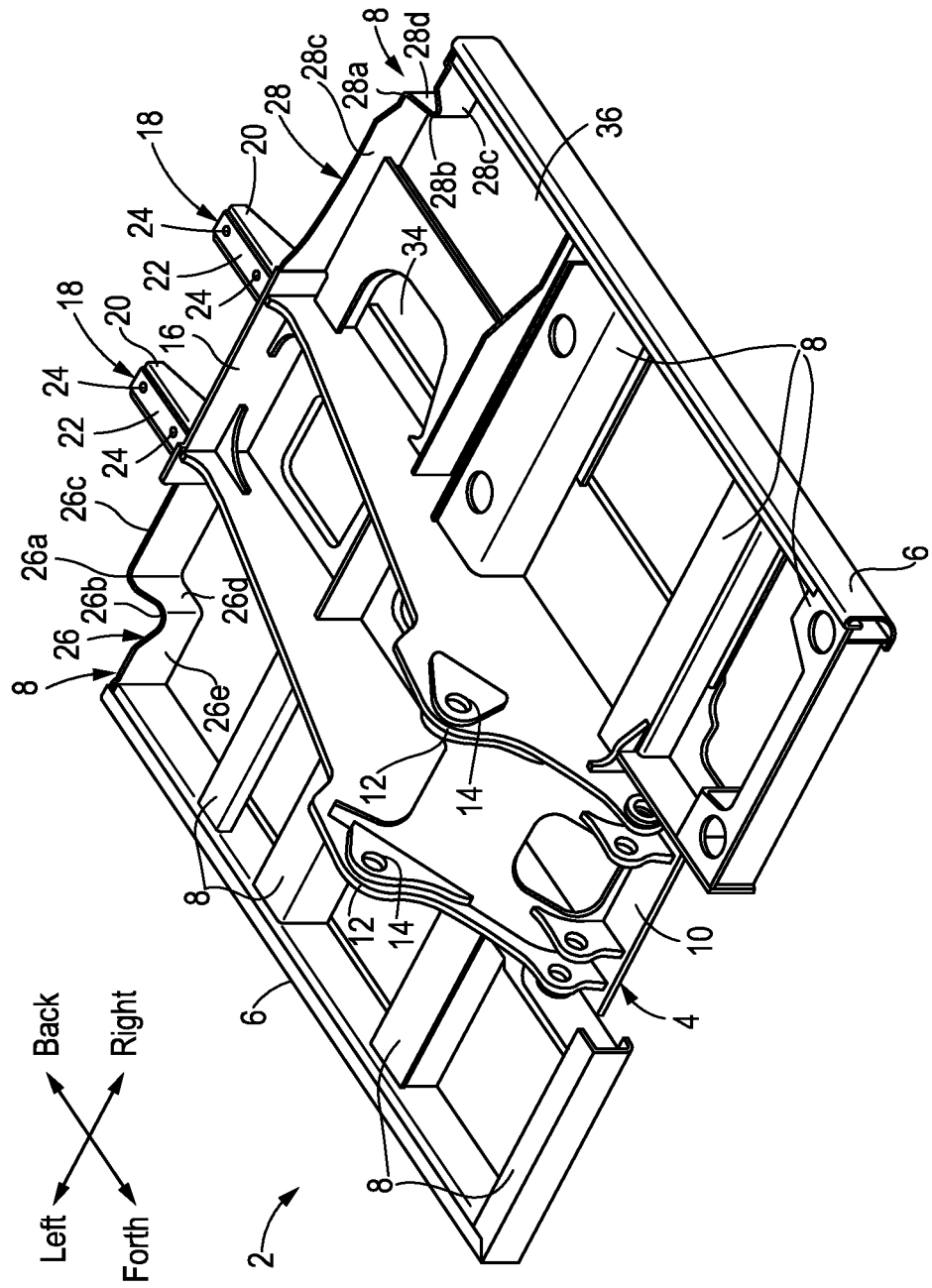
FIG. 1 is a perspective view seen from the front of the frame configured according to this invention.
Figure 2:
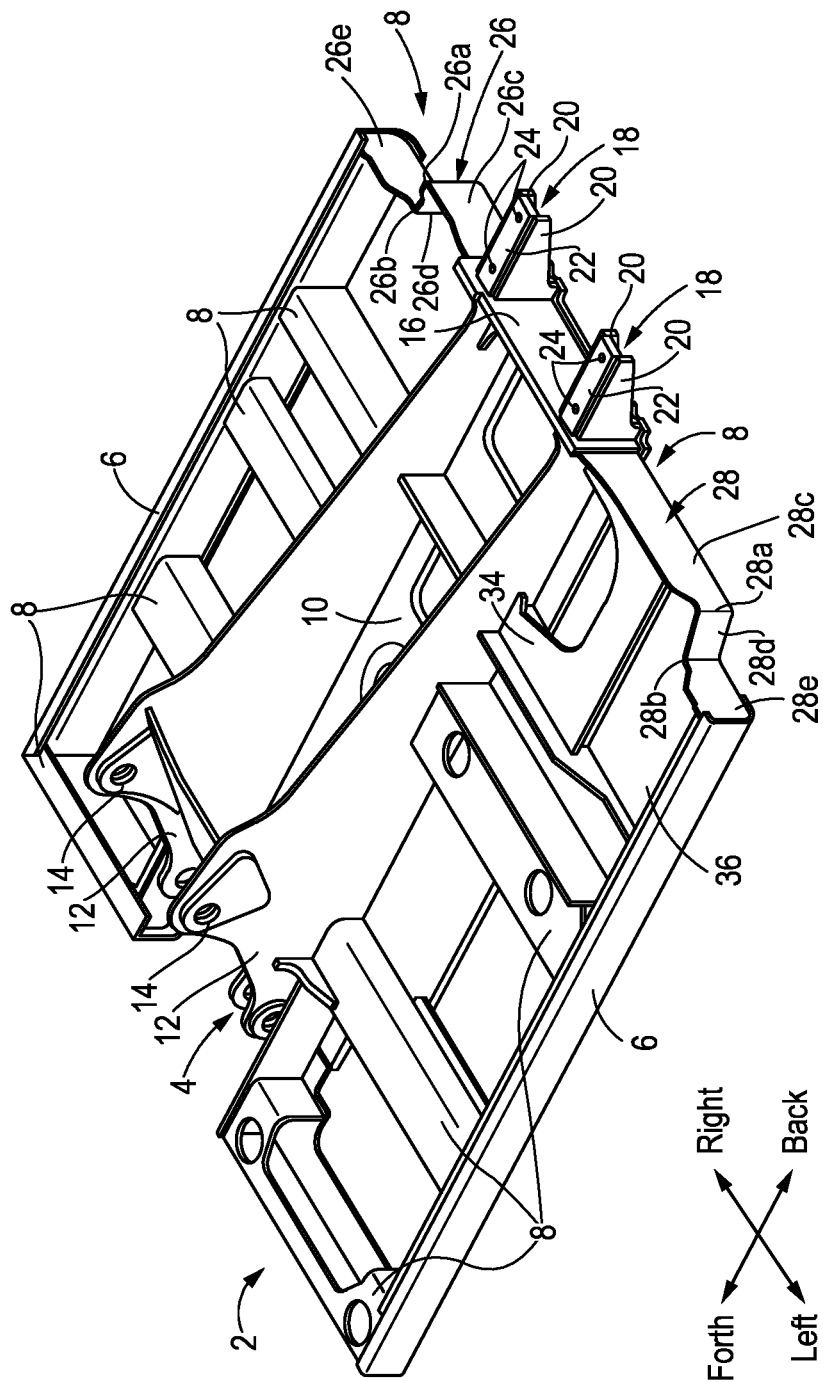
FIG. 2 is a perspective view seen from the back of the frame shown in the FIG. 1.

When an explanation is given by referring to FIGS. 1 and 2, a swiveling frame the whole of which is indicated with the sign 2 comprises the center member 4, a pair of left and right skirt members 6 being horizontally disposed on both sides of the center member 4 and extending in longitudinal direction, and a plurality of beam members 8 connecting the center member 4 and each skirt member 6. Note that the longitudinal and horizontal directions are shown with back forth and right left letters and arrows respectively in FIGS. 1 and 2.

The center member 4 includes the bottom plate 10 and a pair of left and right vertical plates 12 being horizontally disposed at intervals on the top surface of the bottom plate 10 and extending longitudinally. Each vertical plate 12 welded on the top surface of the bottom plate 10 is formed of a triangle shape, and boom connecting pinholes 14 are formed at the top of each vertical plates 12 at the front end side, to which the base end part of the boom of the working arm device (not shown) is operatively pin-connected. Note that the bottom plate 10 and vertical plates 12 are formed out of relatively thick steel sheet because a large load may act on them from the working arm device and others. A transverse plate 16 extending horizontally is connected to a back end of the vertical plates 12. A pair of the counterweight attaching parts 18 are provided on a rear surface of the transverse plate 16 for attaching the counterweight (not shown) in order to balance with the working arm device.

The pair of counterweight attaching parts 18 according to the embodiment shown in the figures are provided on the back end part of the center member 4 and are disposed opposite to each vertical plate 12 across the transverse plate 16. As shown in the FIG. 2, the counterweight attaching part 18 has a pair of triangular support pieces 20 welded on the top surface of the back end part of the bottom plate 10 and the rear surface of the transverse plate 16 each, and rectangular mounting piece 22 welded on the rear surface of the transverse plate 16 and a top end part of each support piece 20. A pair of bolt holes 24 are formed at intervals in a longitudinal direction on the mounting piece 22. Also, a mounting bolt (not shown) is passed from below through each bolt hole 24 so that the counterweight mounted on the top surface of the mounting pieces 22 is attached to the swiveling frame 2 with the mounting bolts.

Each skirt member 6 is a decorative member forming a horizontally outer edge of the swiveling frame 2 and is formed out of steel sheet thinner than the bottom plate 10 or vertical plate 12 of the center member 4.

A plurality of the beam members 8 are disposed at intervals in a longitudinal direction between the center member 4 and right skirt member 6 and between the center member 4 and left skirt member 6, respectively. On the beam members 8, a cab, fuel tank, hydraulic tank, and others are mounted, and the beam members 8 are formed in various shapes according to members to be mounted. The beam members 8 according to the embodiment shown in the figure include plate beam members 26, 28 disposed in a perpendicularly erected manner against the bottom plate 10 of the center member 4.

Figure 3:
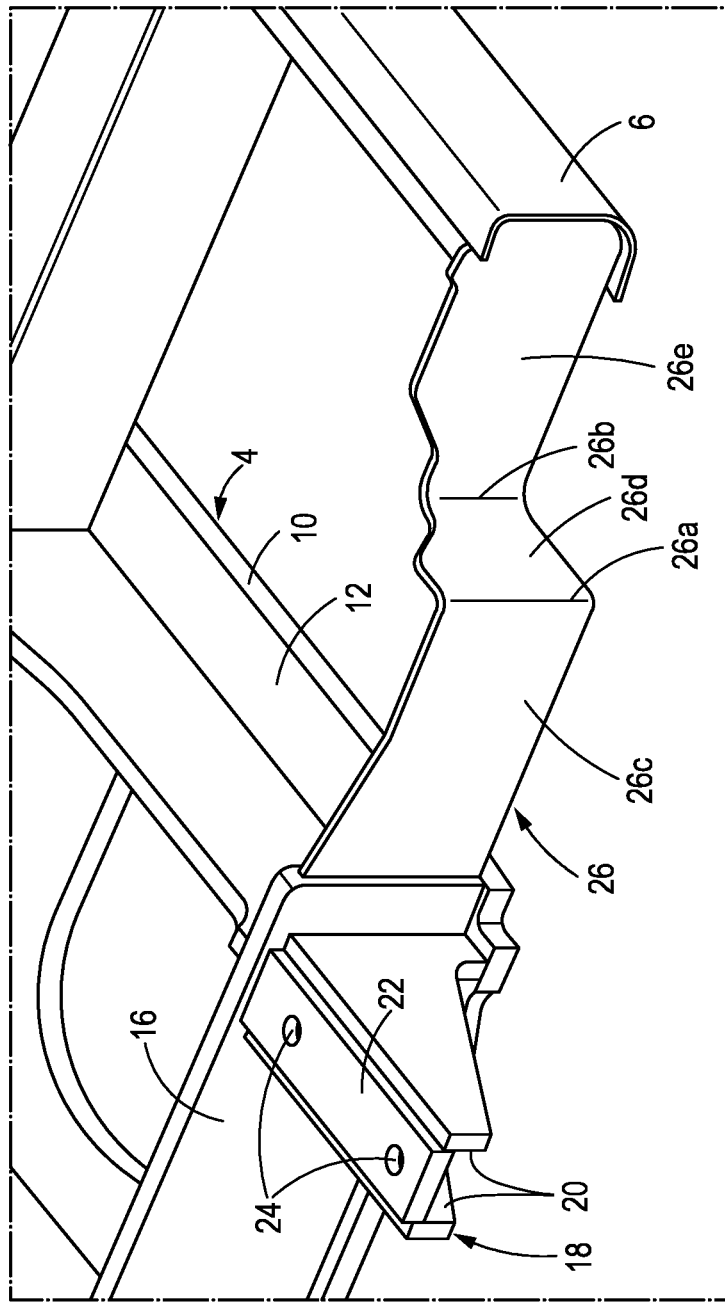
FIG. 3 is a perspective view seen from the back of the right plate beam member shown in the FIG. 1.

As shown in the FIG. 3, first and second bent parts 26a, 26b are formed on the right plate beam member 26, and the right plate beam member 26 has the first part 26c extending outward in a horizontal direction from the center member 4 (right end part of transverse plate 16 in the embodiment illustrated in the figure) to the first bent part 26a, the second part 26d extending from the first bent part 26a to second bent part 26b, and the third part 26e extending outward in a horizontal direction from the second bent part 26b to the right skirt member 6. As shown in the FIG. 4, first and second bent parts 28a, 28b are also formed on the left plate beam member 28, and the left plate beam member 28 has the first part 28c extending outward in a horizontal direction from the left center member 4 (left end part of transverse plate 16 in the embodiment illustrated in the figure) to the first bent part 28a, the second part 28d extending from the first bent part 28a to second bent part 28b, and the third part 28e extending outward in a horizontal direction from the second bent part 28b to the left skirt member 6.

The second bent parts 26b, 28b are provided at the front of the first bent parts 26a, 28a on the right and left plate beam members 26, 28 in the embodiment shown in the figure, and the second parts 26d, 28d are extending from the first bent parts 26a, 28a to the second bent parts 26b, 28b. Note that the second bent parts 26b, 28b may be provided at the back of the first bent parts 26a, 28a.

Thus, in the swiveling frame 2 in the embodiment shown in the figure, as the plate beam members 26, 28 are disposed in a perpendicularly erected manner against the bottom plate 10, while the degradation of the flexural rigidity 26, 28 is suppressed for the plate beam members, the torsion rigidity of the plate beam members 26, 28 is degraded because the plate beam members 26, 28 have the first bent parts 26a, 28a and the second bent parts 26b, 28b. Therefore, with regard to the swiveling frame 2 according to the embodiment shown in the figure, when a torsion load is acting, the right plate beam member 26 twists from first and second bent parts 26a, 26b as starting points and the left plate beam member 28 also twists from first and second bent parts 28a, 28b as starting points so that a deformation resulted from the torsion load is hardly transmitted to other parts than the plate beam members 26, 28. Hence, in the swiveling frame 2, the stress concentration is mitigated on each place such as the connection parts between the skirt member 4 or beam member 6 and the beam members 8 including the plate beam members 26, 28, and a crack occurrence is prevented.

In the embodiment illustrated in FIGS. 1 and 2, the right plate beam member 26 is disposed at the nearest position (rearmost of right beam members 8) to the counterweight attaching part 18 of the plurality of beam members 8 disposed between the center member 4 and right skirt member 6. Also, the left plate beam member 28 is disposed at the nearest position (rearmost of left beam members 8) to the counterweight attaching part 18 of the plurality of beam members 8 disposed between the center member 4 and left skirt member 6.

Since the torsion load is generated when the counterweight is oscillating and inclining horizontally, a deformation resulted from the torsion load is transmitted from the back to the front of the swiveling frame 2. So, when a torsion load acts on the swiveling frame 2, the plate beam members 26, 28 at a nearest position to the counterweight attaching part 18 is twisted so that the deformation resulted from the torsion load is hardly transmitted to the front of the swiveling frame 2 and a crack occurrence is more effectively prevented. In addition, the plate beam members 26, 28 may not be disposed at the rearmost end on the right and left sides each. Also, a plurality of the plate beam members 26, 28 may be provided on left and right sides each or either one of left and right sides only.

The height dimensions of the first bent parts 26a, 28a or second bent parts 26b, 28b of the plate beam members 26, 28 are preferably smaller than those of horizontally inside end parts of the first parts 26c, 28c and horizontally outside end parts of the third parts 26e, 28e. In the embodiment illustrated in FIG. 3, the height dimension of the second bent part 26b of the right plate beam member 26 is smaller than those of horizontally inside end part of the first part 26c and horizontally outside end part of the third part 26e. Also, the height dimensions of the second bent part 26b side of the second part 26d and the second bent part 26b side of the third part 26e each decrease gradually toward the second bent part 26b.

Figure 4:
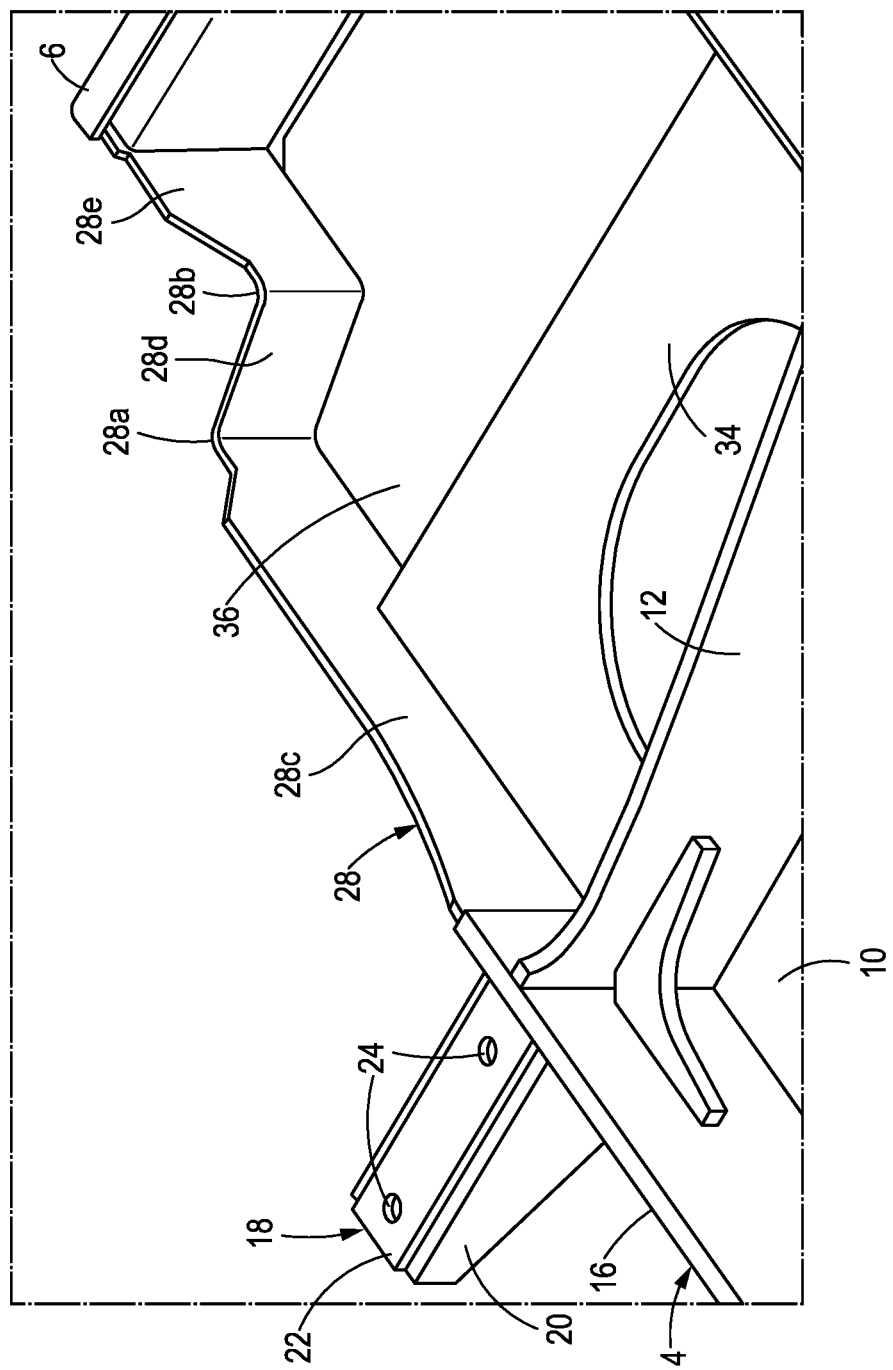
FIG. 4 is a perspective view seen from the front of the left plate beam member shown in the FIG. 1.

On the other hand, as shown in the FIG. 4, in the left plate beam member 28, the height dimensions of the first and second bent part 28a, 28b are smaller than those of horizontally inside end part of the first part 28c and horizontally outside end part of the third part 28e. Also, the height dimension of the first bent part 28a side of the first part 28c decreases gradually toward the first bent part 28a and the height dimension of the second bent part 28b side of the third part 28e decreases gradually toward the second bent part 28b. Note that the height dimension of either the first bent part 28a or the second bent part 28b may be smaller than that of either first bent part 28a or second bent part 28b.

As the embodiment shown in the figure, when the height dimensions of the first bent parts 26a, 28a or second bent parts 26b, 28b are smaller than those of horizontally inside end parts of the first parts 26c, 28c and horizontally outside end parts of the third parts 26e, 28e, rigidities of the first bent parts 26a, 28a and second bent parts 26b, 28b are smaller than those of horizontally inside end parts of the first parts 26c, 28c and horizontally outside end parts of the third parts 26e, 28e. Therefore, when a torsion load acts on the swiveling frame 2, the right plate beam member 26 becomes easily twisted from the first and second bent parts 26a, 26b as starting points and the left plate beam member 28 becomes easily twisted from the first and second bent parts 28a, 28b as starting points so that the deformation resulted from the torsion load is hardly transmitted to other parts than the plate beam members 26, 28. Also, when the plate beam members 26, 28 are twisted, stresses acting on weld zones between the plate beam members 26, 28 and center member 4 and their peripheral sections and weld zones between the plate beam members 26, 28 and skirt member 6 and their peripheral sections are decreased so that the crack hardly occurs.

Figure 5:
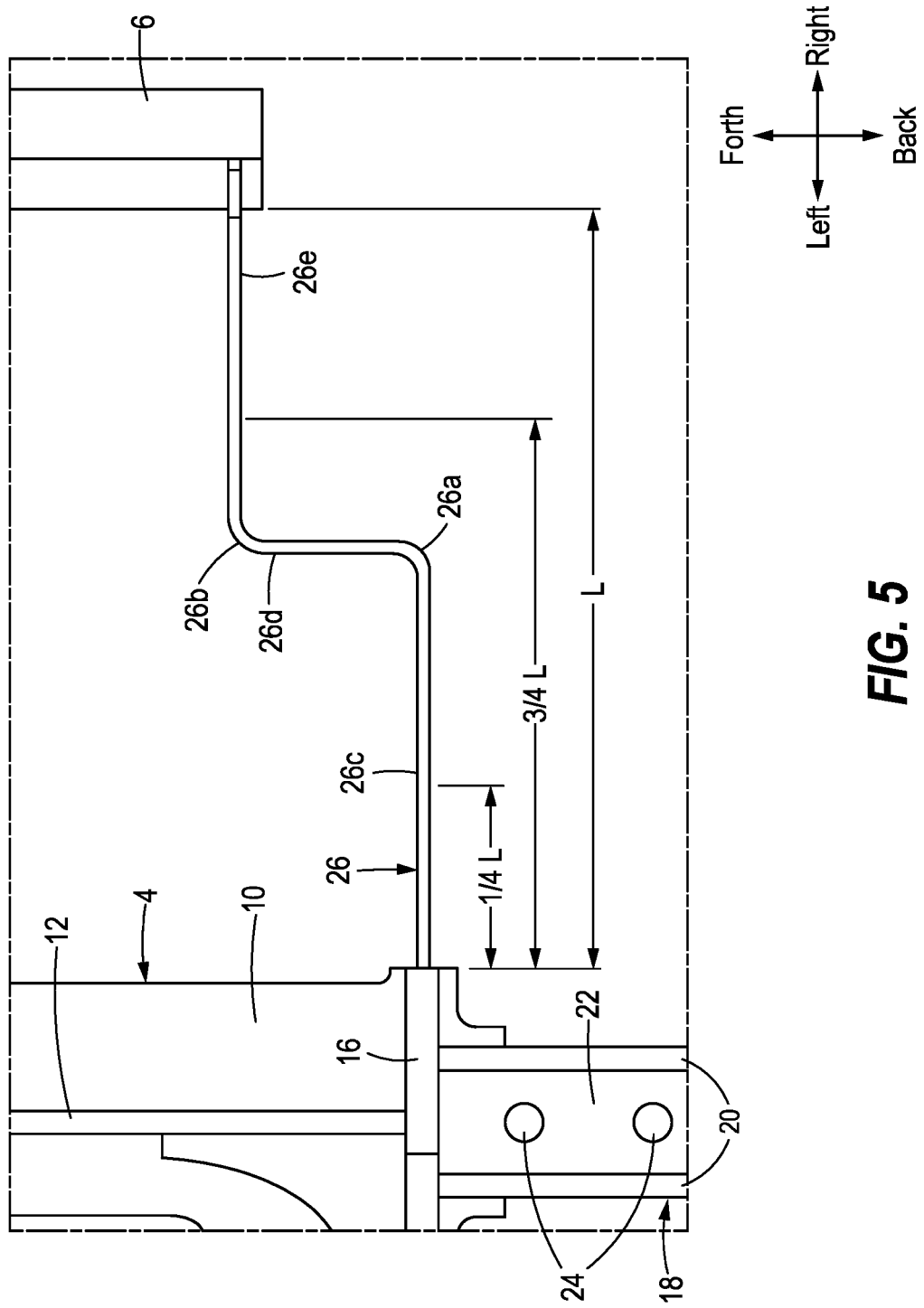
FIG. 5 is a plane view of the right plate beam member shown in the FIG. 1 (θ=0 degrees).

An explanation is provided by referring to FIG. 5. When the dimension from the horizontally outside end part of the center member 4 to horizontally inside end part of the skirt member 6 is assumed to be L, the first and second bent parts 26a, 26b should be suitably located between L/4 and 3L/4. When the first and second bent parts 26a, 26b are located between L/4 and 3L/4 and a torsion load acts on the swiveling frame 2, the plate beam member 26 is twisted from the first and second bent parts 26a, 26b as starting points so that the stresses acting on the weld zones of both right and left ends of the plate beam member 26 and their peripheral sections are reduced and the crack hardly occurs. On the other hand, when the dimension between the horizontally outside end part of the center member 4 and first bent part 26a and the dimension between the second bent part 26b and horizontally inside end part of the skirt member 6 are smaller than L/4, the stresses may be easily concentrated on the weld zones of both right and left ends of the plate beam member 26 and their peripheral sections. Note that with respect to the left plate beam member 28, similar to right plate beam member 26, the first and second bent parts 28a, 28b should be suitably located between L/4 and 3L/4.

Figure 6:
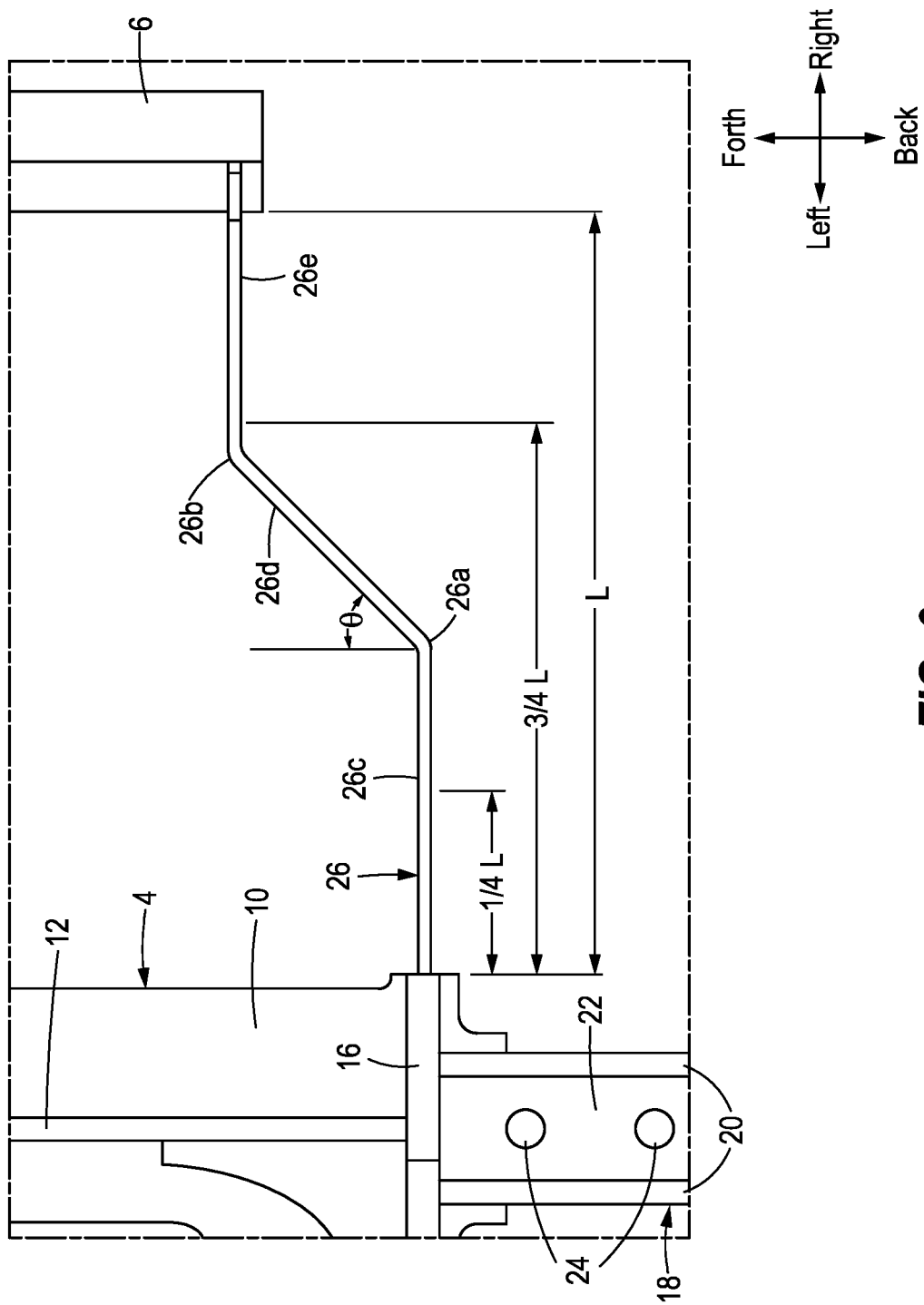
FIG. 6 is a plane view of the right plate beam member shown in the FIG. 1 (θ=45 degrees).
Figure 7:
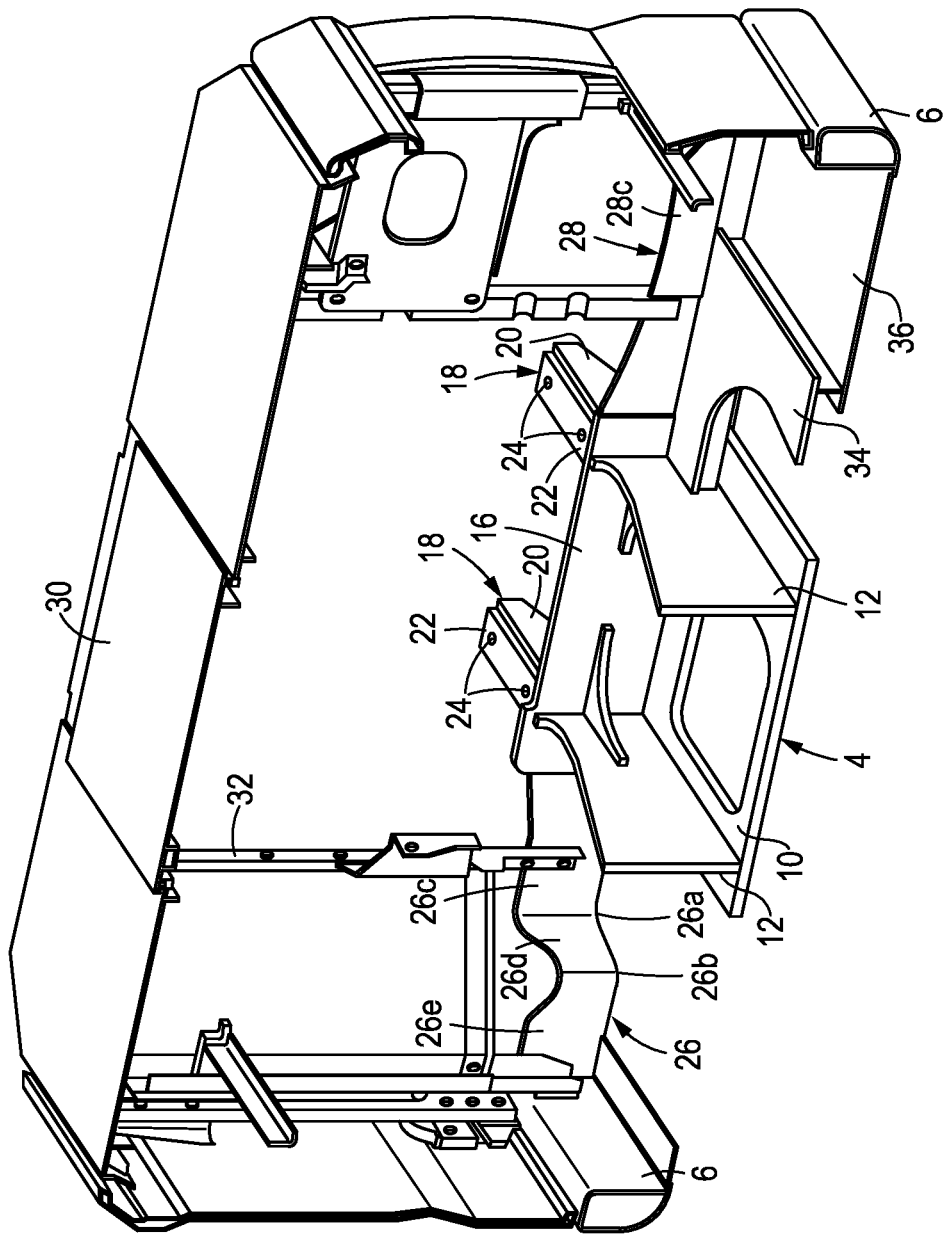
FIG. 7 is a cross-sectional perspective view showing a support pole supporting a top surface cover is attached to the right plate beam member shown in the FIG. 1.

An explanation is provided by referring to FIGS. 5 and 6. The angle between an inner surface (left surface) of the second part 26d of the plate beam member 26 and an outer surface (right surface) of the vertical plate 12 of the center member 4 is assumed to be θ (see FIG. 6), the θ should conveniently be 0≤θ≤45 degrees. The FIG. 5 illustrates a plane view of the plate beam member 26 when the θ is zero degrees (the second part 26d is parallel to the vertical plate 12). The FIG. 6 illustrates a plane view of the plate beam member 26 when the θ is 45 degrees. With respect to a relationship between a twisting property of the plate beam member 26 and θ when the torsion load is acting on the swiveling frame 2, since the torsion load is generated when the counterweight is oscillating and inclining horizontally, the nearer to zero the θ is, the smaller the torsion rigidity of the plate beam member 26 is and the more the plate beam member 26 is twisted so that the deformation resulted from the torsion load is hardly transmitted to other parts than the plate beam member 26. On the other hand, when the θ is greater than 45 degrees, the plate beam member 26 is hardly twisted so that the deformation resulted from the torsion load is easily transmitted to other parts than the plate beam member 26. Note that, with respect to the left plate beam member 28, similar to the right plate beam member 26, the angle between an inner surface (right surface) of the second part 28d and an outer surface (left surface) of the vertical plate 12 should conveniently be 0≤θ≤45 degrees.

In the embodiment illustrated in the figure, the first and third parts 26c, 26e of the plate beam member 26 are perpendicular to the vertical plate 12 of the center member 4, the first and third parts 26c, 26e do not need to be perpendicular to the vertical plate 12. Also, the first, second, and third parts 26c, 26d, 26e each do not need to extend straight. The same applies to the left plate beam member 28.

Although the plate beam members 26, 28 tend to be easily twisted compared with other beam member 8 when the torsion load is acting on the swiveling frame 2, they can keep enough rigidity to provide an attaching part (a bracket or box, for example) for attaching a constituent member of the hydraulic excavator. Therefore, as shown in the FIG. 6, a support pole 32 supporting a top surface cover 30 of the upper swiveling body may be attached to the right plate beam member 26, or some parts (not shown) such as a valve and filter may be attached to the plate beam members 26, 28. Also, a thin plate member (bottom covers 34, 36, for example) with comparatively low rigidity may be appropriately welded on the plate beam member 26, 28 which will not impede the twisting property of the plate beam member 26, 28 when a torsion load acts on the swiveling frame 2.

In addition, when a torsion load acts on the swiveling frame 2, the longer the length of the second parts 26*d*, 28*d* is, the more easily the plate beam members 26, 28 are twisted: and the shorter the length of the second parts 26*d*, 28*d* is, the more hardly the plate beam members 26, 28 are twisted. Therefore, the length of the second parts 26*d*, 28*d* are appropriately determined according to a magnitude of the expected torsion load, vehicle component, and others.

REFERENCE SIGNS LIST

2: Swiveling frame
4: Center member
6: Skirt member
8: Beam member
10: Bottom plate
12: Vertical plate
18: Counterweight attaching part
26: Right plate beam member
26*a*: First bent part
26*b*: Second bent part
26*c*: First part
26*d*: Second part
26*e*: Third part
28: Left plate beam member
28*a*: First bent part
28*b*: Second bent part
28*c*: First part
28*d*: Second part
28*e*: Third part

The invention claimed is:

1. A frame of a construction machine comprising:
a center member including a bottom plate and a pair of left and right vertical plates being horizontally disposed at intervals on a top surface of the bottom plate, extending longitudinally, and being provided with a counterweight attaching part at a back end part; a pair of left and right skirt members being horizontally disposed on both left and right sides of the center member and extending in longitudinal direction; and a plurality of beam members disposed at intervals in a longitudinal direction between the center member and right skirt member and between the center member and left skirt member, respectively;
wherein the plurality of beam members include a plate beam member disposed in a perpendicularly erected manner against the bottom plate; wherein the plate beam member is formed with first and second bent parts; and wherein the plate beam member includes a first part extending outward in a horizontal direction from the center member to the first bent part, a second part extending from the first to second bent part, and a third part extending outward in a horizontal direction from the second bent part to the skirt member; and
wherein when an angle between an inner surface of the second part of the plate beam member and outer surface of the vertical plate of the center member is $\theta$, the $\theta$ is less than 45 degrees.

2. The frame of a construction machine of claim 1, wherein a height dimension of the first or second bent part of the plate beam member is smaller than those of horizontally inside end part of the first part and horizontally outside end part of the third part.

3. The frame of a construction machine of claim 1, wherein when a dimension from a horizontally outside end part of the center member to a horizontally inside end part of the skirt member is L, each of the first and second bent parts is located between L/4 and 3L/4.

4. The frame of a construction machine of claim 1, wherein the $\theta$ is equal to 0 degrees.

5. The frame of a construction machine of claim 1, wherein the plate beam member is nearest to the counterweight attaching part out of a plurality of the beam members disposed between the center member and right skirt member or out of the plurality of the beam members disposed between the center member and left skirt member.

* * * * *